(12) United States Patent
Imao et al.

(10) Patent No.: US 12,491,150 B2
(45) Date of Patent: Dec. 9, 2025

(54) COMPOUND IN WHICH POLYGLYCEROL, FATTY ACID, AND DICARBOXYLIC ACID HAVE BEEN ESTERIFIED

(71) Applicant: Taiyo Kagaku Co., Ltd., Yokkaichi (JP)

(72) Inventors: Ayae Imao, Yokkaichi (JP); Yoshiyuki Matsumoto, Yokkaichi (JP); Tomonori Higuchi, Yokkaichi (JP)

(73) Assignee: TAIYO KAGAKU CO., LTD., Yokkaichi (JP)

( * ) Notice: Subject to any disclaimer, the term of this patent is extended or adjusted under 35 U.S.C. 154(b) by 0 days.

(21) Appl. No.: 18/844,103

(22) PCT Filed: Feb. 8, 2023

(86) PCT No.: PCT/JP2023/004240
§ 371 (c)(1),
(2) Date: Sep. 5, 2024

(87) PCT Pub. No.: WO2023/181682
PCT Pub. Date: Sep. 28, 2023

(65) Prior Publication Data
US 2025/0107994 A1    Apr. 3, 2025

(30) Foreign Application Priority Data
Mar. 25, 2022 (JP) ................. 2022-050592

(51) Int. Cl.
| | | |
|---|---|---|
| *A61K 8/39* | (2006.01) | |
| *A61K 8/86* | (2006.01) | |
| *A61Q 1/14* | (2006.01) | |
| *C08G 65/00* | (2006.01) | |

(52) U.S. Cl.
CPC ............ *A61K 8/86* (2013.01); *C08G 65/00* (2013.01)

(58) Field of Classification Search
None
See application file for complete search history.

(56) References Cited

U.S. PATENT DOCUMENTS

| | | |
|---|---|---|
| 9,890,107 B2 | 2/2018 | Schuch et al. |
| 2013/0237672 A1 | 9/2013 | Rouse et al. |

FOREIGN PATENT DOCUMENTS

| | | | | |
|---|---|---|---|---|
| CN | 111620780 | * | 9/2020 | ............ C07C 67/08 |
| CN | 111620780 A | | 9/2020 | |
| JP | 56-40605 A | | 4/1981 | |
| JP | 59-27807 A | | 2/1984 | |
| JP | 7-223925 A | | 8/1995 | |
| JP | 10-265324 A | | 10/1998 | |
| JP | 10-305222 A | | 11/1998 | |
| JP | 2006-273753 A | | 10/2006 | |
| JP | 2008-31102 A | | 2/2008 | |
| JP | 2016-155819 A | | 9/2016 | |
| JP | 2017-206450 A | | 11/2017 | |
| JP | 6977190 B1 | | 12/2021 | |
| WO | WO 2012/007754 A1 | | 1/2012 | |
| WO | WO 2022/172645 A1 | | 8/2022 | |

OTHER PUBLICATIONS

International Search Report (PCT/ISA/210), issued in PCT/JP2023/004240, dated Apr. 18, 2023.
Extended European Search Report for European Application No. 23774281.2, dated Sep. 3, 2025.

* cited by examiner

*Primary Examiner* — Brian Gulledge
(74) *Attorney, Agent, or Firm* — Birch, Stewart, Kolasch & Birch, LLP

(57) ABSTRACT

A compound which is an ester of a polyglycerol, a fatty acid and a dicarboxylic acid, wherein the compound satisfies the following (A) to (D):
(A) an average degree of polymerization of the polyglycerol is from 2 to 20;
(B) among the total fatty acid, a total proportion of an unsaturated fatty acid and a branched fatty acid having 18 to 22 carbon atoms is 70% by mass or more;
(C) a mass ratio of the polyglycerol to the fatty acid (polyglycerol:fatty acid) is from 1:0.7 to 1:1.5; and
(D) the number of carbon atoms of the dicarboxylic acid is from 4 to 12, and a molar ratio to the polyglycerol (dicarboxylic acid/polyglycerol) is from 0.01 to 0.30.
According to the present invention, a novel compound having less ocular irritability and having excellent stability without separation upon formulation to ester oil can be provided.

1 Claim, No Drawings

COMPOUND IN WHICH POLYGLYCEROL, FATTY ACID, AND DICARBOXYLIC ACID HAVE BEEN ESTERIFIED

TECHNICAL FIELD

The present invention relates to a compound in which a polyglycerol, a fatty acid and a dicarboxylic acid are esterified, a composition containing the compound and cosmetics containing the same.

BACKGROUND ART

Although cleansing cosmetics have various types, an oily type which has high effect to cleanse makeup and is easily washed out is in mainstream. For example, oily cleansing cosmetics have been proposed which contain (A) a polyglycerol difatty acid ester consisting of a fatty acid having 8 to 10 carbon atoms and a polyglycerol having an average degree of polymerization of from 4 to 10, (B) an esterified polyglycerol difatty acid ester consisting of a fatty acid having 18 to 22 carbon atoms and a polyglycerol having an average degree of polymerization of from 8 to 15, and (C) an oil agent, wherein the oily cleansing cosmetics are characterized by that (A):(B) is from 12:5 to 1:1 (Patent Publication 1).

PRIOR ART REFERENCES

Patent Publications

Patent Publication 1: Japanese Patent Laid Open No. 2017-206450

SUMMARY OF THE INVENTION

Problems to be Solved by the Invention

However, the oily cleansing cosmetics of Patent Publication 1 needs to formulate two kinds of polyglycerol fatty acid esters, and additionally it was found that the cleansing cosmetics may have problems in ocular irritability. Accordingly, further improvements are needed.

The problems of the present invention are to provide a novel compound having less ocular irritability and having excellent stability without separation upon formulation to ester oil.

Means to Solve the Problems

The present invention relates to the following [1] to [3]:
[1] A compound which is an ester of a polyglycerol, a fatty acid and a dicarboxylic acid, wherein the compound satisfies the following (A) to (D):
(A) an average degree of polymerization of the polyglycerol is from 2 to 20;
(B) among the total fatty acid, a total proportion of an unsaturated fatty acid and a branched fatty acid having 18 to 22 carbon atoms is 70% by mass or more;
(C) a mass ratio of polyglycerol to the fatty acid (polyglycerol:fatty acid) is from 1:0.7 to 1:1.5; and
(D) the number of carbon atoms of the dicarboxylic acid is from 4 to 12, and a molar ratio to the polyglycerol (dicarboxylic acid/polyglycerol) is from 0.01 to 0.30.
[2] A composition containing the compound as defined in [1] and an oil agent.
[3] Cosmetics containing the compound as defined in [1] or the composition as defined in [2].

Effects of the Invention

According to the present invention, a novel compound having less ocular irritability and having excellent stability without separation upon formulation to ester oil can be provided.

MODES FOR CARRYING OUT THE INVENTION

As a result of intensively studying the above problems, the inventors newly found that ocular irritability is less and stability is excellent without separation upon formulation to ester oil by using an ester of specified polyglycerol, fatty acid and dicarboxylic acid. Although the mechanisms are unclear, it is assumed that an unsaturated fatty acid and a branched fatty acid which occupy many proportions of constitutional fatty acids in the compound of the present invention have low ocular irritability.

The compound of the present invention is an ester of a polyglycerol, a fatty acid and a dicarboxylic acid, and satisfies the following (A) to (D):
(A) an average degree of polymerization of the polyglycerol is from 2 to 20;
(B) among total fatty acids, a total proportion of an unsaturated fatty acid and a branched fatty acid having 18 to 22 carbon atoms is 70% by mass or more;
(C) a mass ratio of the polyglycerol to the fatty acid (polyglycerol:fatty acid) is from 1:0.7 to 1:1.5; and
(D) the number of carbon atoms of the dicarboxylic acid is from 4 to 12, and a molar ratio to the polyglycerol (dicarboxylic acid/polyglycerol) is from 0.01 to 0.30.

An average degree of polymerization of polyglycerol according to the compound of the present invention is, from the viewpoints of usability and stability, from 2 to 20, preferably from 3 to 20, and more preferably from 4 to 10. An average degree of polymerization of polyglycerol herein refers to an average degree of polymerization of polyglycerol calculated from a hydroxyl value according to the terminal group analysis method, and is an average degree of polymerization calculated from (Formula 1) and (Formula 2):

$$\text{Average Degree of Polymerization} = \frac{(112.2 \times 10^3 - 18 \times \text{Hydroxyl Value})}{(74 \times \text{Hydroxyl Value} - 56.1 \times 10^3)} \quad \text{(Formula 1)}$$

$$\text{Hydroxyl Value} = (a-b) \times 28.05 / \text{Amount of Collected Samples (g)} \quad \text{(Formula 2)}$$

a: Amount of 0.5 N potassium hydroxide solution consumed by blank test (ml)
b: Amount of 0.5 N potassium hydroxide solution consumed by main test (ml)

The hydroxyl value in the above (Formula 1) is calculated with (Formula 2) according to "JOCS Standard methods for the analysis of fats, oils and related materials (I), 1996" edited by Japan Oil Chemists' Society.

The fatty acid according to the compound of the present invention includes an unsaturated fatty acid and a branched fatty acid having 18 to 22 carbon atoms (i.e., linear unsaturated fatty acid, branched saturated fatty acid, branched unsaturated fatty acid). In the fatty acid according to the compound of the present invention, from the viewpoints of usability and stability, a total proportion of an unsaturated fatty acid and a branched fatty acid having 18 to 22 carbon atoms is 70% by mass or more, preferably from 75 to 100% by mass, and more preferably from 85 to 100% by mass, among total fatty acids. The unsaturated fatty acid and the branched fatty acid having 18 to 22 carbon atoms include an isostearic acid, an oleic acid, a linoleic acid, a linolenic acid, a ricinoleic acid, an erucic acid and the like, and can contain one or more kinds.

Beside the unsaturated fatty acid and the branched fatty acid having 18 to 22 carbon atoms, the fatty acid according to the compound of the present invention includes a saturated fatty acid, hydroxy fatty acids and a polymer or copolymer thereof, and preferably a saturated fatty acid having 14 to 24 carbon atoms and a hydroxy fatty acid having 9 to 22 carbon atoms. The degree of polymerization of the polymer or copolymer is preferably from 2 to 8, and more preferably from 5 to 8. Specifically, the fatty acid includes a myristic acid, a palmitic acid, a stearic acid, a hydroxy stearic acid, a polyhydroxy stearic acid and the like, and can contain one or more kinds. From the viewpoint of usability and stability, these fatty acids are preferably from 0 to 30% by mass, preferably from 0 to 25% by mass, and more preferably from 0 to 15% by mass, among total fatty acids.

A mass ratio of the polyglycerol to the fatty acid of the compound of the present invention (polyglycerol:fatty acid) is, from the viewpoints of usability and stability, from 1:0.7 to 1:1.5, and preferably from 1:0.7 to 1:1.2.

The dicarboxylic acid according to the compound of the present invention includes a linear or branched, saturated or unsaturated dicarboxylic acid having 4 to 12 carbon atoms. Specifically, the dicarboxylic acid includes a succinic acid, maleic acid, adipic acid, sebacic acid, dodecanedioic acid and the like, and can contain one or more kinds.

A molar ratio of the dicarboxylic acid according to the compound of the present invention to the polyglycerol (dicarboxylic acid/polyglycerol) is, from the viewpoints of usability and stability, from 0.01 to 0.30, preferably from 0.1 to 0.27, and preferably from 0.15 to 0.24.

The compound of the present invention can be obtained by esterifying the polyglycerol, the fatty acid and the dicarboxylic acid mentioned above according to a general synthesis method of a polyglycerol fatty acid ester, and may be further purified according to a known method. For example, the compound can be produced by adding a catalyst such as an alkali to the polyglycerol, the fatty acid and the dicarboxylic acid which are used as raw materials, and carrying out esterification reaction under ambient pressure or reduced pressure, at 200° C. or higher.

Since the compound of the present invention has less ocular irritability and has excellent stability without separation upon formulation to an ester oil, the compound can be suitably used for oily cosmetics using an ester oil, and can also be used for oily cosmetics using an oil agent other than an ester oil or cosmetics such as emulsified cosmetics other than oily ones. Cosmetics can be widely used in a skin care product, a skin cleansing agent, a makeup cosmetic, and a hair cosmetic and the like. For example, cosmetics include a cleansing oil, a cleansing oil gel, a cleansing balm, a cleansing milk, a cleansing liquid, an emulsion, a body milk, a bath oil, a bath milk, a hair oil, a hair balm and the like.

Incidentally, the compound of the present invention is not limited to a cosmetic application, but may be used in other applications.

The present invention also discloses a composition containing the compound of the present invention and an oil agent.

The content of the compound of the present invention in the composition of the present invention is preferably from 0.05 to 30% by mass, and more preferably from 0.05 to 25% by mass.

The content of the compound of the present invention in the composition of the present invention is preferably from 1 to 30 parts by mass, and more preferably from 2 to 25 parts by mass, based on 100 parts by mass of the oil agent.

The oil agent in the composition of the present invention includes an ester oil, a hydrocarbon oil, an animal and plant oil, a silicone oil, a higher alcohol, a fatty acid, wax and the like, and the oil agent is preferably an ester oil, a hydrocarbon oil or an animal and plant oil.

The ester oil includes diethylhexyl adipate, diisopropyl adipate, diisobutyl adipate, di-2-hexyldecyl adipate, diheptylundecyl adipate, avocado oil fatty acid ethyl, alkyl benzoate, isostearyl glyceryl, hexyldecyl isostearate, isopropyl isostearate, octyldodecyl isostearate, isocetyl isostearate, isostearyl isostearate, glyceryl isostearate, cholesteryl isostearate, isotridecyl isononanoate, isononyl isononanoate, isodecyl isononanoate, tridecyl isononanoate, ethylhexyl isopalmitate, ethylhexyl isopelargonate, cetyl ethylhexanoate, octyldodecyl erucate, cetosteraryl ethylhexanoate, ethylene glycol fatty acid ester, octyldodecyl erucate, alkyl ethylhexanoate (C14, C16, C18), isocetyl ethylhexanoate, cetearyl ethylhexanoate, stearyl ethylhexanoate, isostearyl ethylhexanoate, olive oil fatty acid decyl, olive oil fatty acid octyldodecyl, ethyl oleate, oleyl oleate, octyldodecyl oleate, decyl oleate, phytosteryl oleate, (caprylic/capric) glycerides, cetyl caprate, cetyl caprylate, diethylhexyl succinate, polypropylene glycol oligo succinate, acetylated lanolin, glyceryl diisostearate, neopentyl glycol diisostearate, propylene glycol dicaprylate, neopentyl glycol dicaprate, neopentyl glycol diethylhexanoate, ethylene glycol diethylhexanoate, ethylene glycol dioleate, propylene glycol dicaprate, hexyldecyl dimethylethylhexanoate, octyldodecyl dimethylethylhexanoate, propylene glycol dipelargonate, hexyldecyl stearate, dialkyl carbonate, decaglyceryl nonaisostearate, decaglyceryl decaisostearate, pentaerythrityl tetraethylhexanoate, diglyceryl tetraisostearate, glyceryl triisostearate, diglyceryl triisostearate, trimethyrolpropane triisostearate, glyceryl trioleate, glyceryl tricaprylate, triethylhexanoin, trimethyrolpropane triethylhexanoate, glyceryl tri(caprylate/caprate), lauryl lactate, octyldodecyl lactate, hexyldecyl neodecanoate, isostearyl palmitate, isopropyl palmitate, ethylhexyl palmitate, isocetyl palmitate, ethylhexyl hydroxystearate, isotridecyl myristate, isocetyl myristate, isostearyl myristate, isopropyl myristate, octyldodecyl myristate, isostearyl laurate, isopropyl lanolate, hexyl laurate, methylheptyl laurate, octyldodecyl ricinoleate, tocopherol lenoleate, octyldodecyl ricinolate, diisostearyl malate and the like, and ester oil is preferably cetyl ethylhexanoate, ethylhexyl palmitate, glyceryl tri (caprylate/caprate), isocetyl myristate, octyldodecyl myristate, hexyl laurate.

The hydrocarbon oil includes isododecane, hydrogenated polyisobutenes, squalane, seresin, paraffin, pristine, liquid paraffin, liquid isoparaffin vaseline and the like, and the hydrocarbon oil is preferably liquid paraffin.

The animal and plant oil includes avocado oil, linseed oil, argan oil, almond oil, *perilla* oil, olive oil, orange roughy oil, cocoa butter, carrot oil, cucumber oil, beef tallow, coconut oil, grape seed oil, sesame oil, wheat germ oil, rice bran oil, sasanqua oil, safflower oil, shea butter, soybean oil, turtle oil, clove oil, tea oil, evening primrose oil, *camellia* oil, corn oil, lard, rapeseed oil, *coix* barley oil, palm oil, palm kernel oil, peanut oil, castor oil, sunflower oil, hazelnut oil, macadamia nut oil, mink oil, meadowfoam oil, cotton seed oil, coconut oil, *Rosa canilla* oil, cream, *coix* barley oil, *jojoba* oil, lavender oil, egg yolk oil, rice oil, lanolin, rosemary oil, and the animal and plant oil is preferably olive oil, safflower oil, *camellia* oil, rapeseed oil, palm oil, castor oil, sunflower oil, *jojoba* oil, and coconut oil.

The suitable range of the content of the oil agent in the composition of the present invention varies depending upon applications. For example, the content of the oil agent in the composition of the oily cosmetics can be from 35 to 99% by mass, from 50 to 98% by mass, and the like. In addition, the content of the oil agent in the composition of the emulsified cosmetics can be, for example, from 0.1 to 20% by mass, from 0.5 to 15% by mass, and the like.

The composition of the present invention can further contain polyglycerol fatty acid ester, besides the above ingredients. From the viewpoints of usability and stability, a polyglycerol fatty acid ester having an unsaturated fatty acid and/or a branched fatty acid having 18 to 22 carbon atoms is preferred. In addition, HLB of the polyglycerol fatty acid ester is preferably from 2 to 18, and more preferably from 5 to 13. The polyglycerol fatty acid ester includes polyglyceryl-2 oleate, polyglyceryl-2 sesquioleate, polyglyceryl-5 oleate, polyglyceryl-5 dioleate, polyglyceryl-5 trioleate, polyglyceryl-10 stearate, polyglyceryl-10 oleate, polyglyceryl-10 dioleate, polyglyceryl-10 pentaoleate, polyglyceryl-10 diisostearate, and the like. The content of the polyglycerol fatty acid ester is preferably from 0.05 to 20% by mass, and more preferably from 0.1 to 15% by mass.

The composition of the present invention can optionally further contain other ingredients depending upon applications. For example, in the case where the composition is a cosmetic composition, besides the above various ingredients, the composition can further contain arbitrary ingredients which can be used in cosmetics such as water, surfactants, polyhydric alcohol, aqueous gelating agents, oily gelating agents, powders, antioxidants, colorants, chelating agents, refreshing agents, thickening agents, plant extracts, vitamins, neutralizing agents, moisturizing agents, anti-inflammatory agents, pH adjusting agents, amino acids, ultraviolet absorbents, preservatives, antibacterial agents, and perfumes.

The polyhydric alcohol includes glycerol, diglycerol, triglycerol, polyglycerol, 1,3-butylene glycol, propylene glycol, dipropylene glycol, ethylene glycol, diethylene glycol, polyethylene glycol, pentane diol, isoprene glycol, erythritol, solbitol, maltitol, lactose, fructose, maltose and the like, and the polyhydric alcohol is preferably glycerol or diglycerol.

The thickening agent includes glyceryl behenate/eicosadioate, polyglyceryl-10 behenate/eicosadioate, dextrin palmitate, inulin stearate, dextrin myristate, polyglyceryl-20 octadeca(behenate/hydroxystearate), and the like.

The composition of the present invention can be prepared by mixing the compound of the present invention with the oil agent in accordance with the conventional method.

The composition of the present invention can be suitably used for oily cosmetics in the same manner as the compound of the present invention, but can also be used for cosmetics such as emulsified cosmetics other than oily cosmetics. In addition, the composition of the present invention may be directly used as cosmetics, and also the composition further containing arbitrary ingredients mentioned above can be made cosmetics. Incidentally, the composition of the present invention is not limited to the application of cosmetics, but may be used in other applications.

A method of producing the cosmetics of the present invention includes a method of producing comprising the step of having the cosmetics contain the above mentioned each ingredient. As used herein, "the step of having the cosmetics contain the above mentioned each ingredient" includes an embodiment in which the previously prepared composition of the present invention is added, and also an embodiment in which cosmetics are prepared by distinctly formulating the above mentioned each ingredient.

In addition, the present invention also discloses a method of reducing ocular irritability, a method of improving usability and a method of improving stability of the oily cosmetics, comprising the step of having the cosmetics contain the above mentioned each ingredient.

EXAMPLES

The present invention will be particularly described by showing Examples and Comparative Examples, without intending to limit the scope of the present invention to the following Examples.

Preparation of Compounds 1 to 17, and Compounds A to D

As shown in Tables 1 to 3, a fatty acid, a dicarboxylic acid and a polyglycerol were added to a reaction flask, alkaline catalysts were added thereto, and an esterification reaction was carried out at 260° C. to obtain compounds. All the acid values of compounds were 1 or less.

Preparation of Compounds E to G

Compounds were obtained in the same manner as the above except that a dicarboxylic acid was not used.

The denotations in Tables 1 to 3 are as follows.
(Section of C18-22 Unsaturated or Branched Fatty Acid (1))
  isoC18: Isostearic acid
  C18:1: Oleic acid
(Section of Other Fatty Acid (2))
  C18: Stearic acid
  C18OH: Hydroxy stearic acid
  C18OH(6): Polyhydroxy stearic acid (degree of polymerization: 6)
(Section of Dicarboxylic Acid)
  C10: Sebacic acid
  C4: Succinic acid
  C6: Adipic acid

TABLE 1

|  | Compound 1 | Compound 2 | Compound 3 | Compound 4 | Compound 5 | Compound 6 | Compound 7 | Compound 8 | Compound 9 |
| --- | --- | --- | --- | --- | --- | --- | --- | --- | --- |
| Degree of polymerization of polyglycerol | 4 | 10 | 20 | 2 | 3 | 4 | 4 | 4 | 4 |
| C18-22 unsaturated or branched fatty acid (1) | isoC18 | isoC18 | isoC18 | isoC18 | isoC18 | C18:1 | isoC18 | isoC18 | isoC18 |
| Other fatty acid (2) | — | — | — | — | — | — | C18 | C18 | C18 |
| Formulation rate of fatty acids (1):(2) | 100:0 | 100:0 | 100:0 | 100:0 | 100:0 | 100:0 | 98.4:1.6 | 86.6:13.4 | 71.9:28.1 |

TABLE 1-continued

|  | Compound 1 | Compound 2 | Compound 3 | Compound 4 | Compound 5 | Compound 6 | Compound 7 | Compound 8 | Compound 9 |
|---|---|---|---|---|---|---|---|---|---|
| Mass ratio of polyglycerol:fatty acids (1) + (2) | 1:0.91 | 1:0.79 | 1:0.78 | 1:0.91 | 1:0.90 | 1:0.90 | 1:0.91 | 1:0.93 | 1:0.93 |
| Dicarboxylic acid | C10 | C10 | C10 | C10 | C10 | C10 | C10 | C10 | C10 |
| Molar ratio of dicarboxylic acid to polyglycerol | 0.20 | 0.20 | 0.20 | 0.20 | 0.20 | 0.20 | 0.20 | 0.20 | 0.20 |

TABLE 2

|  | Compound 10 | Compound 11 | Compound 12 | Compound 13 | Compound 14 | Compound 15 | Compound 16 | Compound 17 |
|---|---|---|---|---|---|---|---|---|
| Degree of polymerization of polyglycerol | 4 | 4 | 4 | 4 | 4 | 4 | 4 | 4 |
| C18-22 unsaturated or branched fatty acid (1) | isoC18 | isoC18 | isoC18 | isoC18 | isoC18 | isoC18 | isoC18 | isoC18 |
| Other fatty acid (2) | C18OH | C18OH(6) | — | — | — | — | — | — |
| Formulation rate of fatty acids (1):(2) | 98.3:1.7 | 97.6:2.4 | 100:0 | 100:0 | 100:0 | 100:0 | 100:0 | 100:0 |
| Mass ratio of polyglycerol:fatty acids (1) + (2) | 1:0.91 | 1:0.91 | 1:0.95 | 1:0.93 | 1:0.91 | 1:0.92 | 1:0.90 | 1:1.2 |
| Dicarboxylic acid | C10 | C10 | C4 | C6 | C10 | C10 | C10 | C10 |
| Molar ratio of dicarboxylic acid to polyglycerol | 0.20 | 0.20 | 0.20 | 0.20 | 0.05 | 0.15 | 0.25 | 0.20 |

TABLE 3

|  | Compound A | Compound B | Compound C | Compound D | Compound E | Compound F | Compound G |
|---|---|---|---|---|---|---|---|
| Degree of polymerization of polyglycerol | 4 | 4 | 4 | 4 | 4 | 2 | 6 |
| C18-22 unsaturated or branched fatty acid (1) | isoC18 | isoC18 | isoC18 | isoC18 | isoC18 | — | — |
| Other fatty acid (2) | C18 | — | — | — | — | C8 | C8 |
| Formulation rate of fatty acids (1):(2) | 60.0:40.0 | 100:0 | 100:0 | 100:0 | 100:0 | 0:100 | 0:100 |
| Mass ratio of polyglycerol:fatty acids (1) + (2) | 1:0.91 | 1:0.66 | 1:2 | 1:0.91 | 1:0.91 | 1:1.04 | 1:0.92 |
| Dicarboxylic acid | C10 | C10 | C10 | C10 | — | — | — |
| Molar ratio of dicarboxylic acid to polyglycerol | 0.20 | 0.20 | 0.20 | 0.40 | — | — | — |

Preparation 1 of Oily Cosmetics

Examples 1 to 17 and Comparative Examples 1 to 7

As shown in Tables 4 to 6, 15 g of the compounds prepared in Tables 1 to 3 and 85 g of cetyl ethylhexanoate (EXCEPARL HO/Kao Corporation) were heated and dissolved at 70° C., and the mixture was stirred and cooled to room temperature, to prepare oily cosmetics.

Preparation 2 of Oily Cosmetics

Examples 18 to 21

As shown in Table 7, oily cosmetics were prepared in the same manner as that of Preparation 1 except that a polyglycerol fatty acid ester was used in combination in addition to the compounds prepared in Tables 1 to 3.

Preparation 3 of Oily Cosmetics

Example 22

As shown in Table 8, oily cosmetics were prepared in the same manner as that of Preparation 1 except that isocetyl myristate (NIKKOL ICM-R/Nikko Chemicals) and hexyl laurate (SR CRODAMOL HL/CRODA Japan) were used in place of cetyl ethylhexanoate.

Preparation 4 of Oily Cosmetics

Examples 23 to 39 and Comparative Examples 8 to 14

As shown in 9 to 11, 15 g of compounds prepared in the above and 85 g of liquid paraffin (MORESCOWHITE P-70/MORESCO Corporation) were heated and dissolved at 70° C., and the mixture was stirred and cooled to room temperature, to prepare oily cosmetics.

Preparation 5 of Oily Cosmetics

Examples 40 and 41

As shown in Table 12, 15 g of the compounds prepared in the above and polyglycerol fatty acid ester in total, and 85 g of olive oil (CROPURE OL-LQ-(JP)/CRODA Japan) were heated and dissolved at 70° C., and the mixture was stirred and cooled to room temperature, to prepare oily cosmetics.

Preparation 6 of Oily Cosmetics

Examples 42 and 43

As shown in Table 13, 15 g of the compounds prepared in the above and polyglycerol fatty acid ester in total, and 85 g of glyceryl tri(caprylate/caprate) (SUNOIL MCT-7/Taiyo Kagaku Co., Ltd.) were heated and dissolved at 70° C., and the mixture was stirred and cooled to room temperature, to prepare oily cosmetics.

As to oily cosmetics obtained in Preparations 1 to 6 of Oily Cosmetics, each of stability, feeling upon washing out and ocular irritability was assessed. Incidentally, products with assessment of "x" of stability were not subjected to assessments for feeling upon washing out and ocular irritability, and described as "—".

<Stability>

Ten grams of oily cosmetics were placed into a vial having 20 ml of volume and 2.5 cm of inner diameter, and stability was assessed according to the following assessment criteria. The results are shown in Tables 4 to 13.
(Assessment Criteria)
  ○: Turbidity or separation was not found
  X: Separated <Feeling Upon Washing Out>

One gram of oily cosmetics was applied to the back of a hand, the applied area was massaged for 30 seconds, and then the skin feeling immediately after rinsing with water was assessed according to the following assessment criteria. The assessment was carried out by 13 professional panelists, and products in which 10 or more out of 13 panelists answered ○ were rated as "3," products in which 8 or 9 out of 13 panelists answered ○ were rated as "2" and products in which 7 or less out of 13 panelists answered ○ were rated as "1." The results are shown in Tables 4 to 11.
(Assessment Criteria)
  ○: Not sticky and feels refreshing
  Δ: Stickiness slightly remains
  X: Sticky <Ocular Irritability>

The ocular irritability when an appropriate amount of oily cosmetics was applied to the eye area was assessed according to the following assessment criteria. The assessment was carried out by 13 professional panelists, and products in which 10 or more out of 13 panelists answered ○ were rated as "3," products in which 8 or 9 out of 13 panelists answered ○ were rated as "2" and products in which 7 or less out of 13 panelists answered ○ were rated as "1." The results are shown in Tables 4 to 11.
(Assessment Criteria)
  ○: Eye is not painful
  Δ: Eye is slightly painful
  X: Eye is painful As to oily cosmetics of Examples 1 and 22, turbidity at the time of emulsification, water resistance and size of emulsified particle were further confirmed.

<Turbidity at the Time of Emulsification>

The oily cosmetics in an amount of 0.1 g is applied and spread to artificial leather. Assuming washing out with water, 2 g of water is poured to the artificial leather. Turbidity at that time was confirmed with eyes and assessed. The results are shown in Tables 4 and 8.
(Assessment Criteria)
  3: Emulsified to white
  2: Slightly emulsified to white
  1: Not emulsified to white <Water Resistance>

Assuming the use with a wet hand, 5 g of the oily cosmetics were placed into a vial having 20 ml of volume and 2.5 cm of inner diameter, and the contents were stirred while adding water by small amount to prepare water-added cosmetics. The limit of water-adding rate which maintains transparency visually was calculated from the following formula and assessed by the following criteria. The results are shown in Tables 4 and 8.

Water-Adding Rate (%)=Water-Adding Amount (g)/5×100 (Assessment Criteria)

⊚: Water-adding rate is 30% or more
  ○: Water-adding rate is from 20 to less than 30%
  Δ: Water-adding rate is from 10 to less than 20%
  X: Water-adding rate is less than 10%

<Size of Emulsified Particle>

One gram of oily cosmetic was placed into a vial having 100 ml of volume and 3.2 cm of inner diameter. After adding 99 g of water to the vial and shaking the vial 20 times, particle size distribution was measured with a particle size analyzer (BECKMAN COULTER LS 13 320). The calculated average particle size was considered as emulsified particle size. The results are shown in Tables 4 and 8.

TABLE 4

|  | Example 1 | Example 2 | Example 3 | Example 4 | Example 5 | Example 6 | Example 7 | Example 8 | Example 9 |
|---|---|---|---|---|---|---|---|---|---|
| Kinds of Compound | Compound 1 | Compound 2 | Compound 3 | Compound 4 | Compound 5 | Compound 6 | Compound 7 | Compound 8 | Compound 9 |
| Formulation proportion of compound (% by mass) | 15 | 15 | 15 | 15 | 15 | 15 | 15 | 15 | 15 |
| Formulation proportion of cetyl ethylhexanoate (% by mass) | 85 | 85 | 85 | 85 | 85 | 85 | 85 | 85 | 85 |
| Stability | ○ | ○ | ○ | ○ | ○ | ○ | ○ | ○ | ○ |
| Feeling upon washing out | 3 | 3 | 2 | 1 | 2 | 3 | 3 | 3 | 2 |
| Ocular irritability | 3 | 3 | 3 | 3 | 3 | 3 | 3 | 3 | 3 |
| Turbidity at the time of emulsification | 3 | — | — | — | — | — | — | — | — |

TABLE 4-continued

|  | Example 1 | Example 2 | Example 3 | Example 4 | Example 5 | Example 6 | Example 7 | Example 8 | Example 9 |
|---|---|---|---|---|---|---|---|---|---|
| Water resistance | ◎ | — | — | — | — | — | — | — | — |
| Size of emulsified particle (μm) | 0.40 | — | — | — | — | — | — | — | — |

TABLE 5

|  | Example 10 | Example 11 | Example 12 | Example 13 | Example 14 | Example 15 | Example 16 | Example 17 |
|---|---|---|---|---|---|---|---|---|
| Kinds of Compound | Compound 10 | Compound 11 | Compound 12 | Compound 13 | Compound 14 | Compound 15 | Compound 16 | Compound 17 |
| Formulation proportion of compound (% by mass) | 15 | 15 | 15 | 15 | 15 | 15 | 15 | 15 |
| Formulation proportion of cetyl ethylhexanoate (% by mass) | 85 | 85 | 85 | 85 | 85 | 85 | 85 | 85 |
| Stability | ○ | ○ | ○ | ○ | ○ | ○ | ○ | ○ |
| Feeling upon washing out | 2 | 3 | 2 | 3 | 1 | 2 | 2 | 2 |
| Ocular irritability | 3 | 3 | 3 | 3 | 3 | 3 | 3 | 3 |

TABLE 6

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Kinds of Compound | Compound A | Compound B | Compound C | Compound D | Compound E | Compound F | Compound G |
| Formulation proportion of compound (% by mass) | 15 | 15 | 15 | 15 | 15 | 15 | 15 |
| Formulation proportion of cetyl ethylhexanoate (% by mass) | 85 | 85 | 85 | 85 | 85 | 85 | 85 |
| Stability | X | X | X | X | X | ○ | ○ |
| Feeling upon washing out | — | — | — | — | — | 1 | 1 |
| Ocular irritability | — | — | — | — | — | 1 | 2 |

TABLE 7

|  | Example 18 | Example 19 | Example 20 | Example 21 |
|---|---|---|---|---|
| Kinds of Compound | Compound 1 | Compound 1 | Compound 17 | Compound 17 |
| Formulation proportion of compound (% by mass) | 14 | 14 | 9 | 9 |
| Polyglycerol fatty acid ester used in combination with compound | Polyglyceryl-10 diisostearate (HLB: 11.1) | Polyglyceryl-10 dioleate (HLB: 11.9) | Polyglyceryl-10 diisostearate (HLB: 11.1) | Polyglyceryl-10 dioleate (HLB: 11.9) |
| Formulation proportion of polyglycerol fatty acid ester (% by mass) | 1 | 1 | 6 | 6 |
| Formulation proportion of cetyl ethylhexanoate (% by mass) | 85 | 85 | 85 | 85 |
| Stability | ○ | ○ | ○ | ○ |
| Feeling upon washing out | 3 | 3 | 3 | 3 |
| Ocular irritability | 3 | 3 | 3 | 3 |

TABLE 8

|  | Example 22 |
|---|---|
| Kinds of Compound | Compound 1 |
| Formulation proportion of compound (% by mass) | 15 |
| Formulation proportion of isocetyl myristate (% by mass) | 49 |
| Formulation proportion of hexyl laurate (% by mass) | 36 |
| Stability | ○ |
| Feeling upon washing out | 3 |
| Ocular irritability | 3 |
| Turbidity at the time of emulsification | 3 |
| Water resistance | ◎ |
| Size of emulsified particle (μm) | 0.49 |

TABLE 9

|  | Example 23 | Example 24 | Example 25 | Example 26 | Example 27 | Example 28 | Example 29 | Example 30 | Example 31 |
|---|---|---|---|---|---|---|---|---|---|
| Kinds of compound | Compound 1 | Compound 2 | Compound 3 | Compound 4 | Compound 5 | Compound 6 | Compound 7 | Compound 8 | Compound 9 |
| Formulation proportion of compound (% by mass) | 15 | 15 | 15 | 15 | 15 | 15 | 15 | 15 | 15 |
| Formulation proportion of liquid paraffin (% by mass) | 85 | 85 | 85 | 85 | 85 | 85 | 85 | 85 | 85 |
| Stability | ○ | ○ | ○ | ○ | ○ | ○ | ○ | ○ | ○ |
| Feeling upon washing out | 3 | 3 | 2 | 1 | 2 | 3 | 3 | 3 | 2 |
| Ocular irritability | 3 | 3 | 3 | 3 | 3 | 3 | 3 | 3 | 3 |

TABLE 10

|  | Example 32 | Example 33 | Example 34 | Example 35 | Example 36 | Example 37 | Example 38 | Example 39 |
|---|---|---|---|---|---|---|---|---|
| Kinds of compound | Compound 10 | Compound 11 | Compound 12 | Compound 13 | Compound 14 | Compound 15 | Compound 16 | Compound 17 |
| Formulation proportion of compound (% by mass) | 15 | 15 | 15 | 15 | 15 | 15 | 15 | 15 |
| Formulation proportion of liquid paraffin (% by mass) | 85 | 85 | 85 | 85 | 85 | 85 | 85 | 85 |
| Stability | ○ | ○ | ○ | ○ | ○ | ○ | ○ | ○ |
| Feeling upon washing out | 3 | 3 | 2 | 3 | 1 | 3 | 2 | 2 |
| Ocular irritability | 3 | 3 | 3 | 3 | 3 | 3 | 3 | 3 |

TABLE 11

|  | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|
| Kinds of compound | Compound A | Compound B | Compound C | Compound D | Compound E | Compound F | Compound G |
| Formulation proportion of compound (% by mass) | 15 | 15 | 15 | 15 | 15 | 15 | 15 |
| Formulation proportion of liquid paraffin (% by mass) | 85 | 85 | 85 | 85 | 85 | 85 | 85 |
| Stability | X | X | X | X | X | ○ | ○ |
| Feeling upon washing out | — | — | — | — | — | 1 | 1 |
| Ocular irritability | — | — | — | — | — | 1 | 2 |

TABLE 12

|  | Example 40 | Example 41 |
|---|---|---|
| Kinds of Compound | Compound 1 | Compound 1 |
| Formulation proportion of compound (% by mass) | 2.5 | 2.5 |
| Polyglycerol fatty acid ester used in combination with compound | Polyglyceryl-2 oleate (HLB: 7.0) | Polyglyceryl-2 sesquioleate (HLB: 5.3) |
| Formulation proportion of polyglyceryl fatty acid ester (% by mass) | 12.5 | 12.5 |
| Formulation proportion of olive oil (% by mass) | 85 | 85 |
| Stability | ○ | ○ |
| Feeling upon washing out | 3 | 3 |
| Ocular irritability | 3 | 3 |

TABLE 13

|  | Example 42 | Example 43 |
| --- | --- | --- |
| Kinds of Compound | Compound 1 | Compound 1 |
| Formulation proportion of compound (% by mass) | 7 | 7 |
| Polyglycerol fatty acid ester used in combination with compound | Polyglyceryl-2 oleate (HLB: 7.0) | Polyglyceryl-2 sesquioleate (HLB: 5.3) |
| Formulation proportion of polyglyceryl fatty acid ester (% by mass) | 8 | 8 |
| Formulation proportion of glyceryl tri(caprylate/caprate) (% by mass) | 85 | 85 |
| Stability | ○ | ○ |
| Feeling upon washing out | 3 | 3 |
| Ocular irritability | 3 | 3 |

As shown in Tables 4 to 8, all the oily cosmetics of Examples 1 to 22 using Compounds 1 to 17 had less ocular irritability, and had excellent stability without separation upon formulation to an ester oil. Incidentally, even a product with an assessment of 1 for feeling upon washing out reached a level usability. In addition, it has been confirmed that Examples 1 and 22 had good turbidity at the time of emulsification, water resistance and size of emulsified particle, and it was found that the cosmetics had visually good usability, could be used with a wet hand and had an excellent washability. In addition, as shown in Tables 9 to 13, it was found that the cosmetics could be used for oil agents other than the ester oil.

Formulation Example

Hereinafter, Formulation Examples of cosmetics of the present invention are listed up. The present invention is not limited to these Formulation Examples at all. Incidentally, all the formulated amounts are shown by % by mass, based on total amount of products.

TABLE 14

Formulation Example 1: Water resistant cleansing oil

| Raw material name | Formulation proportion (% by mass) |
| --- | --- |
| Compound 1 | 15 |
| Cetyl ethylhexanoate | 84 |
| Glycerol | 1 |

TABLE 15

Formulation Example 2: Water resistant cleansing oil

| Raw material name | Formulation proportion (% by mass) |
| --- | --- |
| Compound 11 | 15 |
| Cetyl ethylhexanoate | 84 |
| Glycerol | 1 |

TABLE 16

Formulation Example 3: Water resistant cleansing oil

| Raw material name | Formulation proportion (% by mass) |
| --- | --- |
| Compound 1 | 15 |
| Cetyl ethylhexanoate | 84 |
| Water | 1 |

TABLE 17

Formulation Example 4: Water resistant cleansing oil

| Raw material name | Formulation proportion (% by mass) |
| --- | --- |
| Compound 11 | 15 |
| Cetyl ethylhexanoate | 84 |
| Water | 1 |

TABLE 18

Formulation Example 5: Plant cleansing oil

| Raw material name | Formulation proportion (% by mass) |
| --- | --- |
| Compound 1 | 4 |
| Polyglyceryl-2 oleate | 6 |
| Glyceryl tri(caprylate/caprate) | 60 |
| Sunflower seed oil | 30 |

TABLE 19

Formulation Example 6: Plant cleansing oil

| Raw material name | Formulation proportion (% by mass) |
| --- | --- |
| Compound 11 | 4 |
| Polyglyceryl-2 oleate | 6 |
| Glyceryl tri(caprylate/caprate) | 60 |
| Sunflower seed oil | 30 |

TABLE 20

Formulation Example 7: Plant cleansing balm

| Raw material name | Formulation proportion (% by mass) |
| --- | --- |
| Compound 1 | 4 |
| Polyglyceryl-2 oleate | 6 |
| Glyceryl tri(caprylate/caprate) | 54 |

TABLE 20-continued

Formulation Example 7: Plant cleansing balm

| Raw material name | Formulation proportion (% by mass) |
|---|---|
| Sunflower seed oil | 30 |
| Polyethylene | 6 |

TABLE 21

Formulation Example 8: Plant cleansing balm

| Raw material name | Formulation proportion (% by mass) |
|---|---|
| Compound 11 | 4 |
| Polyglyceryl-2 oleate | 6 |
| Glyceryl tri(caprylate/caprate) | 54 |
| Sunflower seed oil | 30 |
| Polyethylene | 6 |

TABLE 22

Formulation Example 9: Bath oil

| Raw material name | Formulation proportion (% by mass) |
|---|---|
| Compound 1 | 15 |
| Mineral oil | 84 |
| Perfume | 1 |

TABLE 23

Formulation Example 10: Bath oil

| Raw material name | Formulation proportion (% by mass) |
|---|---|
| Compound 11 | 15 |
| Mineral oil | 84 |
| Perfume | 1 |

TABLE 24

Formulation Example 11: Hair oil

| Raw material name | Formulation proportion (% by mass) |
|---|---|
| Compound 1 | 4 |
| Polyglyceryl-2 oleate | 6 |
| Camellia seed oil | 30 |
| Glyceryl tri(caprylate/caprate) | 30 |
| Sunflower seed oil | 30 |

TABLE 25

Formulation Example 12: Hair oil

| Raw material name | Formulation proportion (% by mass) |
|---|---|
| Compound 11 | 4 |
| Polyglyceryl-2 oleate | 6 |
| Camellia seed oil | 30 |
| Glyceryl tri(caprylate/caprate) | 30 |
| Sunflower seed oil | 30 |

TABLE 26

Formulation Example 13: Hair balm

| Raw material name | Formulation proportion (% by mass) |
|---|---|
| Compound 1 | 4 |
| Polyglyceryl-2 oleate | 6 |
| Camellia seed oil | 28 |
| Glyceryl tri(caprylate/caprate) | 28 |
| Sunflower seed oil | 28 |
| Polyethylene | 6 |

TABLE 27

Formulation Example 14: Hair balm

| Raw material name | Formulation proportion (% by mass) |
|---|---|
| Compound 11 | 4 |
| Polyglyceryl-2 oleate | 6 |
| Camellia seed oil | 28 |
| Glyceryl tri(caprylate/caprate) | 28 |
| Sunflower seed oil | 28 |
| Polyethylene | 6 |

TABLE 28

Formulation Example 15: O/W Emulsion

| Raw material name | Formulation proportion (% by mass) |
|---|---|
| Compound 1 | 1.0 |
| Polyglyceryl-10 stearate | 1.0 |
| Purified water | 78.6 |
| Glycerol | 2.0 |
| BG | 3.0 |
| Carbomer | 0.2 |
| Xanthan gum | 0.05 |
| Preservative | 0.15 |
| Potassium hydroxide 10% aqueous solution | 1.0 |
| Squalane | 4.0 |
| Cetyl ethylhexanoate | 3.5 |
| Triethylhexanoin | 3.0 |
| Olive oil | 1.0 |
| Cetyl alcohol | 1.0 |
| Dimethicone | 0.5 |

TABLE 29

Formulation Example 16: O/W Emulsion

| Raw material name | Formulation proportion (% by mass) |
|---|---|
| Compound 11 | 1.0 |
| Polyglyceryl-10 stearate | 1.0 |
| Purified water | 78.6 |
| Glycerol | 2.0 |
| BG | 3.0 |
| Carbomer | 0.2 |
| Xanthan gum | 0.05 |
| Preservative | 0.15 |
| Potassium hydroxide 10% aqueous solution | 1.0 |
| Squalane | 4.0 |
| Cetyl ethylhexanoate | 3.5 |
| Triethylhexanoin | 3.0 |
| Olive oil | 1.0 |
| Cetyl alcohol | 1.0 |
| Dimethicone | 0.5 |

TABLE 30

Formulation Example 17: Water resistant Cleansing oil (natural type)

| Raw material name | Formulation proportion (% by mass) |
|---|---|
| Compound 11 | 16 |
| Isocetyl myristate | 36 |
| Olive oil | 5 |
| Glyceryl tri(caprylate/caprate) | 35 |
| Glycerol | 8 |

TABLE 31

Formulation Example 18: Water resistant Cleansing oil (thickening type)

| Raw material name | Formulation proportion (% by mass) |
|---|---|
| Compound 11 | 15 |
| Isocetyl myristate | 30 |
| Methylheptyl laurate | 15 |
| Glyceryl tri(caprylate/caprate) | 35.5 |
| Glyceryl behenate/eicosadioate | 0.5 |
| Glycerol | 4 |

TABLE 32

Formulation Example 19: Plant Cleansing oil

| Raw material name | Formulation proportion (% by mass) |
|---|---|
| Compound 11 | 4 |
| Polyglyceryl-2 oleate | 6 |
| Glyceryl tri(caprylate/caprate) | 40 |
| Sunflower seed oil | 40 |
| Octyldodecanol | 10 |

All of cosmetics of Formulation Examples 1 to 19 had excellent ocular irritability and stability, and also had good feeling upon washing out.

INDUSTRIAL APPLICABILITY

According to the present invention, a novel compound having less ocular irritability and having excellent stability without separation upon formulation to ester oil can be provided.

The invention claimed is:
1. An oily cosmetic comprising
a compound which is an ester of a polyglycerol, a fatty acid and a dicarboxylic acid, wherein the compound satisfies the following (A) to (D):
(A) an average degree of polymerization of the polyglycerol is from 2 to 20;
(B) among the total fatty acid, a total proportion of an unsaturated fatty acid and a branched fatty acid having 18 to 22 carbon atoms is 70% by mass or more;
(C) a mass ratio of the polyglycerol to the fatty acid (polyglycerol:fatty acid) is from 1:0.78 to 1:1.5; and
(D) the number of carbon atoms of the dicarboxylic acid is from 4 to 12, and a molar ratio to the polyglycerol (dicarboxylic acid/polyglycerol) is from 0.01 to 0.30; and
an oil agent,
wherein a content of the oil agent in the oily cosmetic is from 35 to 99% by mass, and
wherein the dicarboxylic acid is selected from the group consisting of maleic acid, adipic acid, sebacic acid, and dodecanedioic acid.

* * * * *